US011361234B2

(12) United States Patent
Muise et al.

(10) Patent No.: US 11,361,234 B2
(45) Date of Patent: Jun. 14, 2022

(54) REAL-WORLD EXECUTION OF CONTINGENT PLANS

(71) Applicant: INTERNATIONAL BUSINESS MACHINES CORPORATION, Armonk, NY (US)

(72) Inventors: Christian Muise, Somerville, MA (US); Miroslav Vodolán, Vlašim (CZ); Ondrej Bajgar, Cernosice (CZ); Shubham Agarwal, Somerville, MA (US); Luis Lastras-Montano, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 929 days.

(21) Appl. No.: 16/117,737

(22) Filed: Aug. 30, 2018

(65) Prior Publication Data
US 2020/0074332 A1    Mar. 5, 2020

(51) Int. Cl.
*G06N 5/04* (2006.01)
(52) U.S. Cl.
CPC ................... *G06N 5/046* (2013.01)
(58) Field of Classification Search
CPC ............... G06N 20/00; G06N 5/046
See application file for complete search history.

(56) References Cited

U.S. PATENT DOCUMENTS

| 2014/0095246 A1* | 4/2014 | Natarajan ...... G06Q 10/063114 |
| | | 705/7.25 |
| 2016/0117593 A1 | 4/2016 | London |
| 2017/0178626 A1 | 6/2017 | Gruber |

OTHER PUBLICATIONS

Chen, "Planning with Task-Oriented Knowledge Acquisition for a Service Robot", (Year: 2016).*
Kaldeli, "Domain-independent planning for services in uncertain and dynamic environments", 2014 (Year: 2014).*
Mattmuller, "Pattern Database Heuristics for Fully Observable Nondeterministic Planning", 2010 (Year: 2010).*
Christian Dornhege, "Integrating Task and Motion Planning Using Semantic Attachments", 2010 (Year: 2010).*
Bjorn Hartmann, "Design as Exploration: Creating Interface Alternatives through Parallel Authoring and Runtime Tuning", 2008 (Year: 2008).*
Ryan, Curtin, "Tree-Independent Dual-Tree Algorithms" 2013 (Year: 2013).*

(Continued)

*Primary Examiner* — Ann J Lo
*Assistant Examiner* — Van C Mang
(74) *Attorney, Agent, or Firm* — Cantor Colburn LLP; Stosch Sabo

(57) ABSTRACT

A computer-implemented method includes determining a current state and a current context of an environment in which an automated agent runs to execute a contingent plan. The state indicates that one or more fluents of a plurality of fluents are true, and the plurality of fluents are associated with a contingent problem solved by the contingent plan. The context describes values corresponding to the one or more fluents. An action is performed with respect to at least a subset of the context. A nondeterministic effect of the action on the environment is evaluated, using a computer processor. The state is updated based on the nondeterministic effect. The context is updated based on the nondeterministic effect.

17 Claims, 5 Drawing Sheets

(56) References Cited

OTHER PUBLICATIONS

Block, S. A. et al., Robust execution on contingent, temporally flexible plans. Proceedings, The Twenty-First National Conference on Artificial Intelligence and the Eighteenth Innovative Applications of Artificial Intelligence Conference, Jun. 2006.

Cashmore, M. et al., Rosplan: Planning in the robot operating system Proceedings of the Twenty-Fifth International Conference on Automated Planning and Scheduling (ICAPS), Jun. 2015.

Conrad, P. R., and Williams, B. C. 2011 Drake: An efficient executive for temporal plans with choice. Journal of Artificial Intelligence Research; 42:607-659. DOI:10.1613/jair.3478. Dec. 2011.

Fadhil, A., Can a Chatbot Determine My Diet?: Addressing Challenges of Chatbot Application for Meal Recommendation, arXiv.org, Cornell University Library. Feb. 25, 2018.

Friedman, M., and Weld, D. S., Efficiently executing information-gathering plans. Proceedings, The Fourteenth National Conference on Artificial Intelligence. Jul. 1997.

Ingrand, F. 2015. Open procedural reasoning systems (open-prs). https://git.openrobots.org/projects/openprs. Accessed: Jul. 23, 2018.

Karpas, E. et al., Robust execution of plans for human-robot teams. Proceedings of the Twenty-Fifth International Conference on Automated Planning and Scheduling, ICAPS 2015, Jerusalem, Israel, Jun. 7-11, 2015. pp. 342-346, AAAI Press, 2015.

Lemai, S., and Ingrand, F. Interleaving temporal planning and execution in robotics domains. In Proceedings of the Nineteenth National Conference on Artificial Intelligence. Jul. 2004.

Leonetti, M. et al.; Induction and Learning of Finite-State Controllers from Simulation; AAMAS '12 Proceedings of the 11th International Conference on Autonomous Agents and Multiagent Systems—vol. 3, pp. 1203-1204, rad.inf.ed.ac.uk; Jun. 2012.

Muise, C. J. et al., Flexible execution of partial order plans with temporal constraints. IJCAI, Aug. 2013.

Verma, V. et al., Plan execution interchange language (plexil) for executable plans and command sequences. ISAIRAS, Jan. 2005.

Williams, B. C. et al., Model-based programming of intelligent embedded systems and robotic space explorers. Proceedings of the IEEE 91(1):212-237 DOI: 10.1109/JPROC.2002.805828. Jan. 2003.

\* cited by examiner

```
(:action prepare_garage_car_exit
; garage door is locked and closed,
; and garage lights are off
:precondition (and (garage_door_locked)
                   (not (garage_door_open))
                   (not (garage_lights_on)))

:effect (and
    (have_fuel_level)
    (oneof
        ; garage door is malfunctioning
        (not (garage_door_locked))
        ; garage door unlocks successfully
        (garage_door_locked))
    (oneof
        ; a visual sensor in garage sets
        ; off the alarm if car is missing
        (garage_alarm_on)
        (and
            ; the car is inside the garage
            (not (garage_alarm_on))
            ; garage lights are turned on
            (garage_lights_on)
            (oneof
                ; garage door opens
                (garage_door_open)
                ; garage door is obstructed
                ; by some object
                (not (garage_door_open))))))
```

FIG. 2

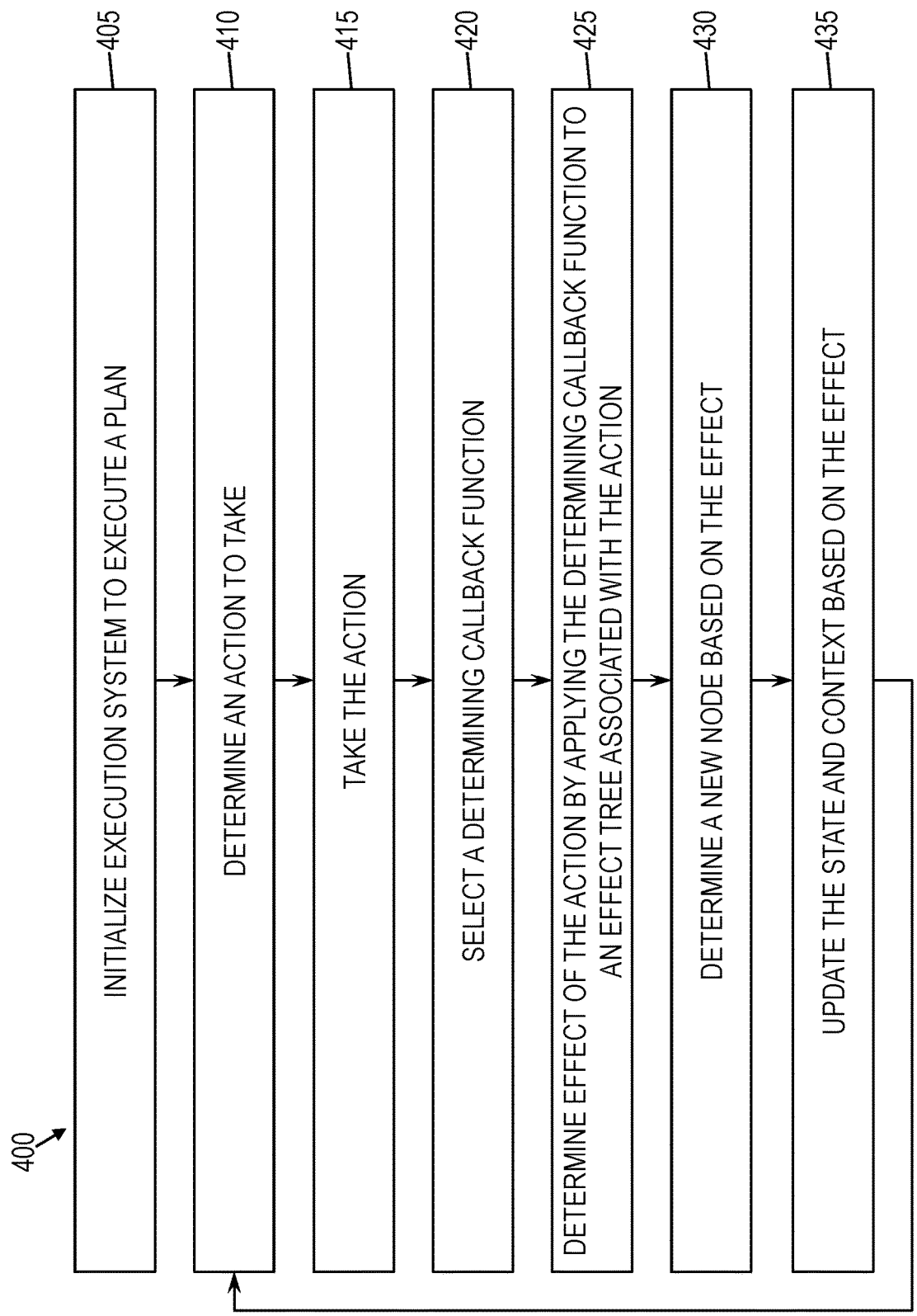

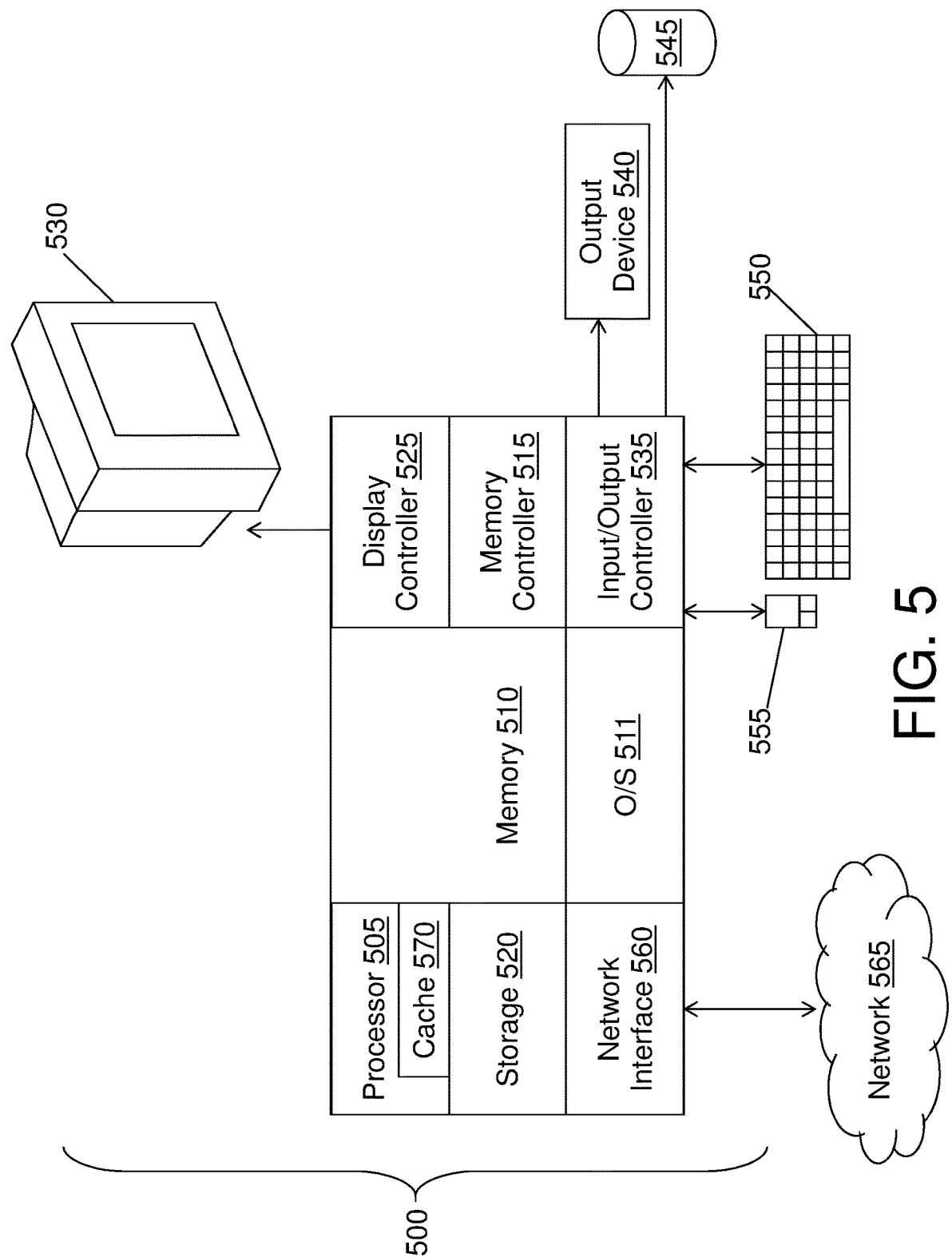

REAL-WORLD EXECUTION OF CONTINGENT PLANS

BACKGROUND

The present invention relates to automated planning and, more specifically, to real-world execution of contingent plans.

Generally, planning is a deliberate process that organizes actions by anticipating their outcomes. Automated planning, also referred to as artificial intelligence (AI) planning, is a branch of artificial intelligence related to the computational study of this deliberate process. Automated planning is relevant to artificial agents, such as unmanned vehicles, home automation systems, cleaning robots, and other agents performing automated tasks.

SUMMARY

Embodiments of the present invention are directed to a computer-implemented method for executing a contingent plan. A non-limiting example of the computer-implemented method includes determining a current state and a current context of an environment in which an automated agent runs to execute a contingent plan. The state indicates that one or more fluents of a plurality of fluents are true, and the plurality of fluents are associated with a contingent problem solved by the contingent plan. The context describes values corresponding to the one or more fluents. An action is performed with respect to at least a subset of the context. A nondeterministic effect of the action on the environment is evaluated, using a computer processor. The state is updated based on the nondeterministic effect. The context is updated based on the nondeterministic effect.

Embodiments of the present invention are directed to a system for executing a contingent plan. A non-limiting example of the system includes a memory having computer-readable instructions and one or more processors for executing the computer-readable instructions to perform a method. The method includes determining a current state and a current context of an environment in which an automated agent runs to execute a contingent plan. The state indicates that one or more fluents of a plurality of fluents are true, and the plurality of fluents are associated with a contingent problem solved by the contingent plan. The context describes values corresponding to the one or more fluents. Further according to the method, an action is performed with respect to at least a subset of the context. A nondeterministic effect of the action on the environment is evaluated. The state is updated based on the nondeterministic effect. The context is updated based on the nondeterministic effect.

Embodiments of the invention are directed to a computer-program product for executing a contingent plan, the computer-program product including a computer-readable storage medium having program instructions embodied therewith. The program instructions are executable by a processor to cause the processor to perform a method. A non-limiting example of the method includes determining a current state and a current context of an environment in which an automated agent runs to execute a contingent plan. The state indicates that one or more fluents of a plurality of fluents are true, and the plurality of fluents are associated with a contingent problem solved by the contingent plan. The context describes values corresponding to the one or more fluents. Further according to the method, an action is performed with respect to at least a subset of the context. A nondeterministic effect of the action on the environment is evaluated. The state is updated based on the nondeterministic effect. The context is updated based on the nondeterministic effect.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 is an example action demonstrating complexities of a nested nondeterministic effect, according to some embodiments of the invention;

FIG. 4 is a flow diagram of a method of executing a contingent plan, according to some embodiments of the invention; and FIG. 5 is a block diagram of a computer system for implementing some or all aspects of the execution system, according to some embodiments of this invention.

Figure 1:
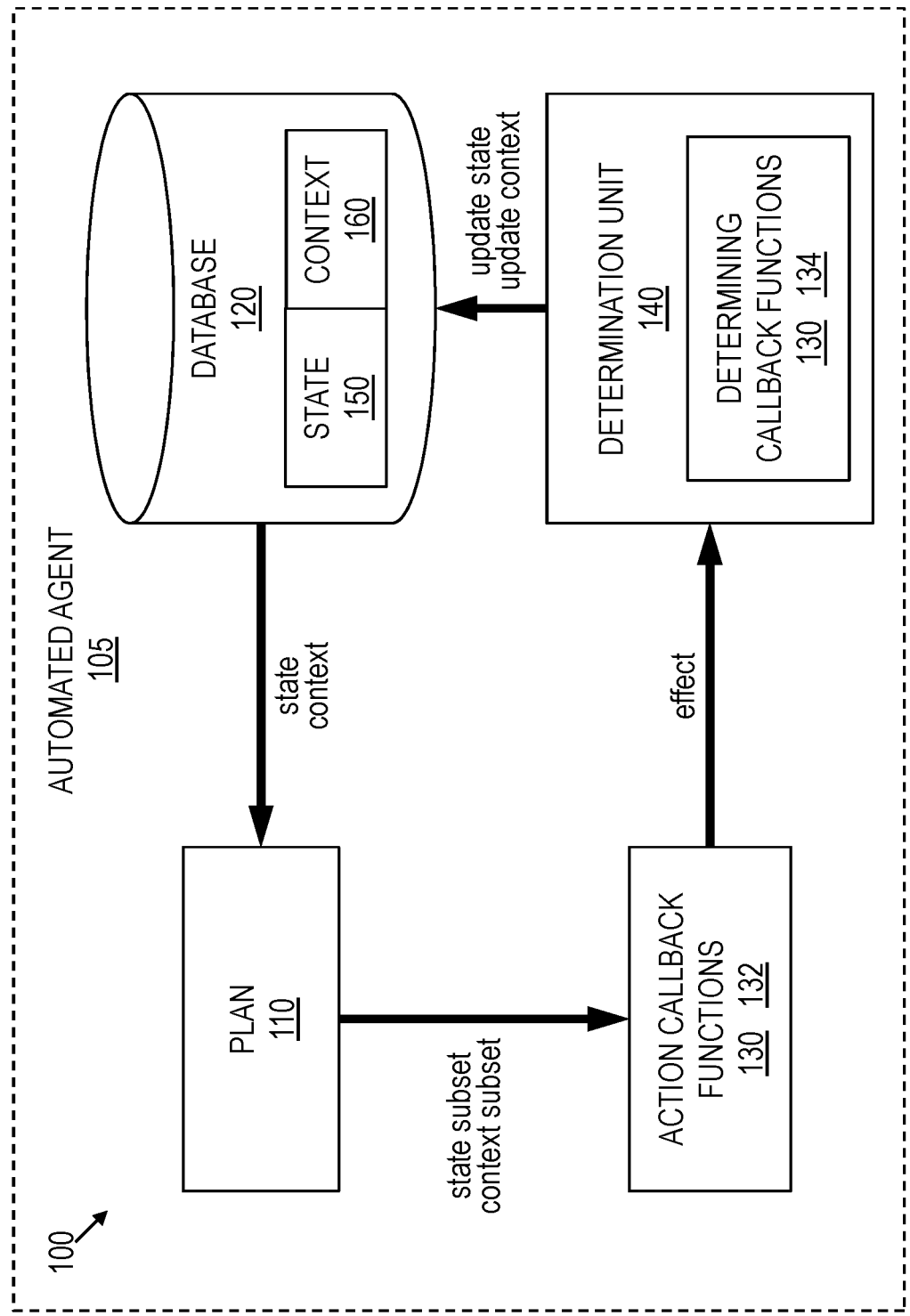
FIG. 1 is a diagram of an execution system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the field of automated planning spans the entire pipeline of developing a plan and deploying a cognitive agent that needs to interact with an environment. From the acquisition of planning models to the online execution of plans, a broad set of challenges must be addressed. According to this disclosure, the term "online" refers to an interactive environment in which decisions may be needed to enable a task to proceed. Contrary to some definitions of the term in other fields, "online" need not necessarily refer to a web-based or internet-based environment. The vast majority of research in automated planning focuses on generating a plan based on an initial problem specification, including the theoretical properties of this task and the implementation details required to do so efficiently. There is far less understanding of the issues associated with executing plans in online environments.

Turning now to an overview of the aspects of the invention, one or more embodiments of the invention address the above-described shortcomings of the prior art by executing plans in a way that manages challenges presented online. While a plan itself is the end game of most research in the field, embodiments of the invention address challenges that arise when a rich plan has been generated and now needs to be executed. In the real world, uncertainty exists. To address this, some embodiments of the invention evaluate nested nondeterministic effects to determine a nondeterministic effect of each action taken, update a state (i.e., a current set of fluents) and a context (i.e., the values of those fluents) that represent the environment, and then determine another action based on the updated state and context.

The above-described aspects of the invention address the shortcomings of the prior art by actively determining an effect of each action, even when that effect involves multiple nested outcomes, rather than assuming a single outcome. Further, by maintaining both a state and a context, embodiments of the invention maintain a practical view of the environment. Thus, embodiments of the invention are able to operate in uncertain environments.

Turning now to a more detailed description of aspects of the present invention, FIG. 1 is a diagram of an execution system 100 according to some embodiments of the invention. In some embodiments of the invention, the execution system 100 is connected to an automated agent 105, such as by being in communication with the automated agent 105 or being integrated with the automated agent 105. The automated agent 105 may be, for example, a home automation system, an unmanned vehicle, a cleaning robot, or some other device required to execute a plan online. More specifically, the execution system 100 together with the automated agent 105 may execute a contingent plan. As shown in FIG. 1, the execution system 100 may include an established plan 110, a database 120, a set of callback functions 130, and a determination unit 140. Generally, the execution system 100 may determine the state of the world, make decisions, and initiate execution of those decisions for the automated agent 105.

The plan 110 may be a contingent plan generated from a fully observable nondeterministic (FOND) planner or fully observable probabilistic planner. Generally, a typical, non-contingent plan is a sequence of actions to be performed, and the outcome for each action is known. In a contingent plan, however, a set of possible outcomes may be known corresponding to each action, but the actual outcome of each action may remain unknown until execution occurs. One of skill in the art will understand how to generate such a plan 110. For example, and not by way of limitation, the plan 110 may take the form of a controller or policy network, a format used by existing planners that deal with uncertainty. A FOND planning problem $\langle F, I, A, G \rangle$ includes fluents F, an initial state $I \subseteq F$, a set of actions A performable by the automated agent 105, and a goal state $G \subseteq g$ F. Each fluent in the set of fluents is a fact, which can be true or false in the environment. A complete state is a subset of fluents presumed to be true while all other fluents are false, while a partial state is a subset of fluents that are presumed to be true without the presumption that the remaining fluents are true or false. In the initial state $I \subseteq F$, a first set of fluents are presumed to be true, and in the goal state $G \subseteq F$, a second set of fluents are presumed to be true. The contingent plan 110 may be the solution to such a problem.

The database 120 may describe a state 150 and context 160 of the environment, which is also referred to herein as the world. It will be understood by one skilled in the art that the database 120 need not be a relational database. Rather, the database 120 may be one or more files or other storage formats capable of maintaining the state 150 and context 160. In some embodiments of the invention, the context C is an aligned assignment of values C:F→Dom, where Dom is an arbitrary, and possibly open-ended, domain. In other words, the context 160 may map a fluent to a value, thereby assigning a value to a fluent. For instance, in an unmanned vehicle, the fluent have_fuel_level may be true or false, depending on whether the current fuel level is known. The knowledge of whether this fluent is true or false may be enough for planning purposes and for determining the current state 150. However, for execution purposes, it may be useful to know the value of the fuel level, and the context 160 may provide that value. For instance, C(have_fuel_level)=10 may indicate that the context 160 maps have_fuel_level to a value of 10, which may indicate that the current fuel level is ten gallons.

According to some embodiments of the invention, contextual information (i.e., the context 160) is tracked and updated as needed in addition to the state 150 being tracked and updated as needed. The state 150 can be viewed as a planner's perspective, while the context 160 can be viewed as the deployment perspective. The execution state 150 may be useful to enable the execution system 100 to decide which actions can be executed, while the context 160 may be useful in actually executing those actions. An improvement gained by maintaining both state 150 and context 160 is twofold: this situates the execution system 100 at the right level of abstraction, and it allows an interconnection between the plan 110 and complex objects (e.g., a web call result) that would be impractical to represent in the planning domain.

The execution system 100 may have at least two sets of callback functions 130: a first set of action callback functions 132 for execution of actions and a second set of determining callback functions 134 for determining effects of actions taken. Specifically, according to this disclosure, $AEF_a$ refers to the action callback function 132 used to execute action a∈A, while $DET_o$ refers to the determining callback function 134 used to determine which one or more outcomes of the nondeterministic effect $\oplus_\varphi \varphi$ results. According to this disclosure, $\varphi$ refers to a subformula, $\oplus_\varphi \varphi$ refers to an exclusive disjunction of subformulae, and $\Lambda_\varphi \varphi$ refers to a conjunction of subformulae. The complexity of nondeterministic effects will be described in more detail below.

In some embodiments of the invention, each callback function 130 may be a black box from the perspective of the execution system 100. In some embodiments of the invention, the execution system 100 has an action callback function 132 associated with each possible action, but it will be understood that a single action callback function may suffice for implementation purposes, as the execution system 100 may provide one or more arguments to specify the nature of the action to be performed or of the determinations to be made. However, for illustrative purposes, this disclosure refers to a respective action callback function 132 associated with each action. Analogously, one or more determining callback functions 134 may be available and useable by the execution system 100. It will be understood that callback functions 130 may be implemented in various ways.

Generally, it may be assumed that the automated agent 105 has a mechanism for performing actions and for detecting characteristics of the world around it to thereby determine an effect on the world. For example, and not by way of limitation, if the automated agent 105 is a home automation system 100, then the automated agent may be in communication with lighting, kitchen appliances, garage doors, etc. Thus, the execution system 100 may perform a callback function 130 to turn on the light in the master bedroom, and the execution system 100 may assume that the home automation system is capable of performing this task responsive to this callback function 130 being called. Analogously, the execution system 100 may perform a callback function 130 to determine how his action affected the world, and the home automation system may be capable of detecting whether the lights did indeed come on. Thus, some embodiments of the execution system 100 assume that callback functions 130 are properly implemented by the automated agent 105.

After performance of an action, the determination unit 140 may determine an effect of that action. Specifically, for instance, the determination unit 140 may determine an effect, which may be a set of one or more outcomes determined from a larger set of nested outcomes. Thus, the effect may be nondeterministic. For instance, determining the effect may be performed by calling one or more determining callback functions 134, as will be described in detail below. The determination unit 140 may then update the state 150 and the context 160 in the database 120 to reflect the effect of the action. The determination unit 140 may be implemented as hardware or software, or a combination of both. For example, and not by way of limitation, the determination unit 140 may be a software module, a specialized hardware circuit, or a combination of these.

Generally, the execution system 100 may repeatedly perform a loop. At each iteration of the loop, there exists a state 150 of the world, a context 160 of variable assignments corresponding to that state 150 of the world, and a current node. An action a is among a set of actions associated with the node and is desired to be taken. The current state 150 and context 160 may be retrieved from the database 120. An action callback function 132 to execute the action a is performed. The determination unit 140 may then call one or more determining callback functions 134, as described in detail below, to determine the effect of the action after its performance. The state 150 and context 160 are then updated based on the determined effect. Each of these activities are described in more detail below.

Some embodiments of the invention recognize the interplay between the execution of an action, and the realization of its effect on the world. In some cases, an action can change the world in a nondeterministic manner. In some embodiments of the invention, the execution system 100 assumes that the effect of an action, although potentially nondeterministic, is fully observable. In practice, this has not been found to be a limitation, because many uncertain settings can be adequately modeled with preexisting low order compilation techniques (e.g., using $K_1$ compilations or width−1 compilations). In some embodiments of the invention, it is further assumed that action execution is blocking and nonconcurrent.

To execute a contingent plan 110, the execution system 100 may run action callback functions 132 associated with each state 150 that is reached, in order to achieve the specified goal state 150, or goal. Each state 150 that is reached may thus be handled by an iteration of the loop. The automated agent 105 may thereby use actions purposefully to achieve the goal. However, in a nondeterministic world, an action can cause one or multiple effects on the state 150 and context 160. Thus, in some embodiments of the invention, the execution system 100 decides which of the possible effects has happened. This is referred to as outcome determination.

According to some embodiments of the invention, action execution is decomposed into two phases, each of which occurs during an iteration: In one phase, the execution system 100 runs a callback function 130 that implements a process in the outside world (e.g., calling a web service, or some other operation of the automated agent 105), and the execution system 100 receives from the automated agent 105 a function call result (e.g., a response code with a payload of information from the web service). In another phase, outcome determination occurs, in which the execution system 100 processes the function call result to update the execution state 150 and context 160. As discussed below, outcome determination may be a complex multistep process.

In some embodiments of the invention, the action callback function 132 and the determining callback functions 134 are given the entire state 150 and context 160 as arguments. However, in practice, this may result in errors that are difficult to debug. Thus, in some embodiments of the invention, only the subset of the context 160 referenced in an action's precondition is accessible by the action callback function 132. In other words, where the context subset for action a is $C_a$, and where $Pre_a$ is a precondition for action a, the following is the case in some embodiments of the invention: $C_a = \{C(f)|f \in Pre_a\}$. This may reduce the potential for model mismatch between the planning view of the state 150 and the full view of the context 160.

Generally, this disclosure adopts the standard notation for FOND planning. An exception to this is that, according to some embodiments of the invention, it is not assumed that action effects (i.e., effects of actions) are a set of one or more nondeterministic effects, one of which is chosen during execution, as is usually assumed in FOND planning. In practice, effects may be a complex nesting of AND and ONEOF clauses, where a ONEOF (i.e., disjunctive OR) clause indicates selection of one of a set of subclauses. This complexity improves the level of sophistication of the execution system 100.

Figure 3:
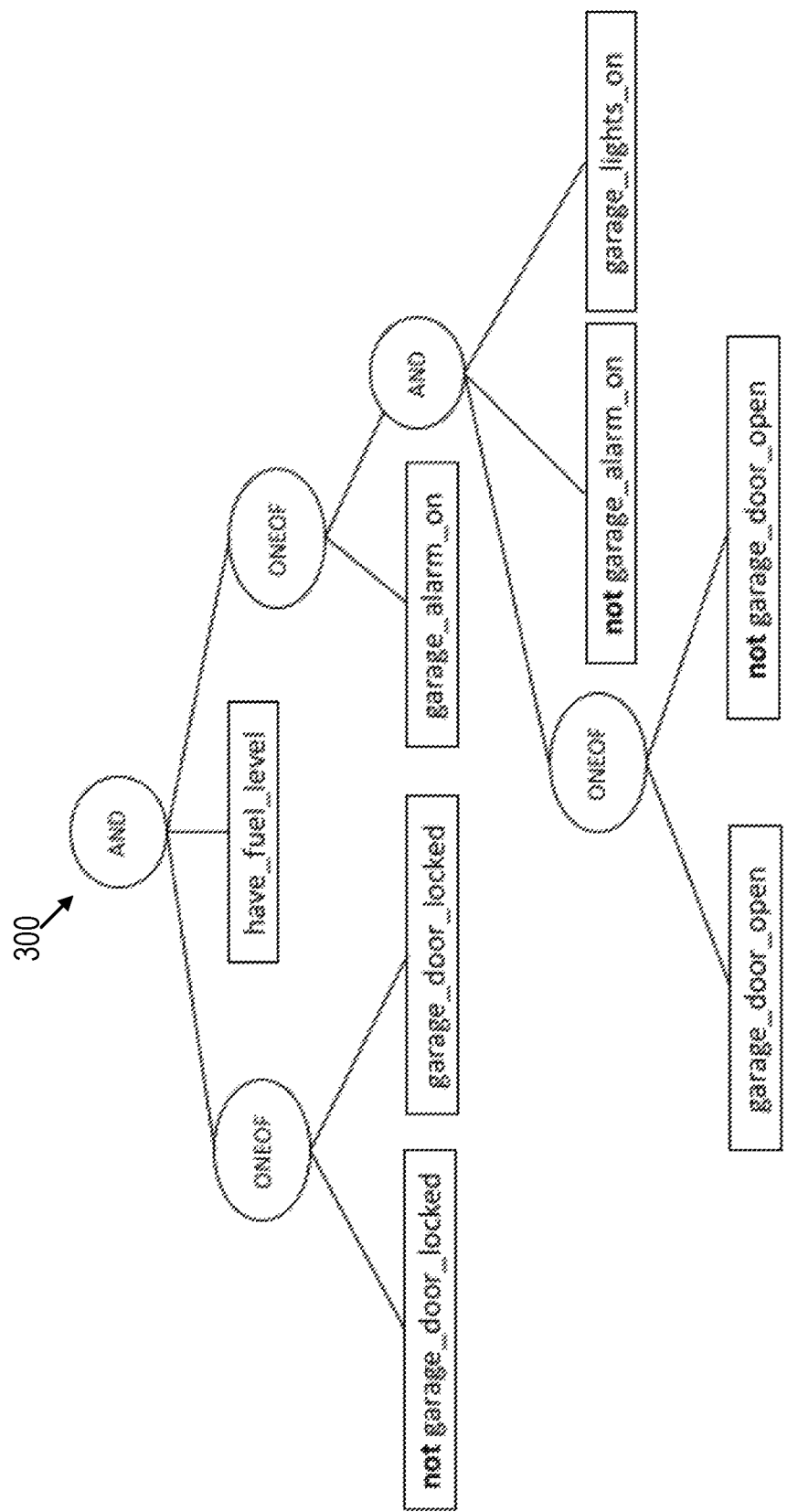
FIG. 3 is an example effect tree illustrating a nested nondeterministic effect of the example in FIG. 2, according to some embodiments of the invention.

FIG. 2 is an example action demonstrating complexities of a nested nondeterministic effect, according to some embodiments of the invention. The action in FIG. 2 is provided in planning domain definition language (PPDL). In this example, the automated agent 105 is a home assistant, which can perform common tasks around a household. Specifically, FIG. 2 is an example PDDL representation of an action to prepare a garage for a car to exit. This example includes a precondition as well as an effect. FIG. 3 represents the action effect of FIG. 2 as a tree, also referred to as an effect tree 300, according to some embodiments of the invention.

According to some embodiments of the invention, a precondition for an action is required for the action to be performed. In some embodiments of the invention, for each action a, the precondition $Pre_a \subseteq F$, and the action a can be performed only in a state s for which $Pre_a \subseteq s$. In other words, in some embodiments of the invention, the partial assignment of fluents in the precondition for action a must exist in the current state 150, in order for action a to be performed. In the example of FIG. 2, the precondition requires that the garage door is locked (garage_door_locked), the garage door is not open (not (garage_door_open)), and the garage lights are not on (not (garage_lights_on)). The fluents at play in this precondition are represented by garage_door_locked, garage_door_open, and garage_lights_on.

In this example, the effect is nondeterministic, such that multiple possible outcomes can occur. Although the effect options are shown in both FIGS. 2-3, the possible outcomes are described herein with respect to the effect tree 300 in FIG. 3. The root of the tree is an AND, which indicates that each branch of the tree extending from the root is expected to be true in the effect. Thus, based on the center branch, the car's fuel level is known (have_fuel_level). Additionally, as indicated by the ONEOF node of the tree on the left branch, either the garage door is not locked (not garage_door_locked) or the garage door is locked (garage_door_locked). Additionally, as indicated by the branch extending to the right from the root, either (1) the garage alarm is on (garage_alarm_on) or (2) either the garage door is open (garage_door_open) or the garage door is not open (not garage_door_open), the garage alarm is not on (not garage_alarm_on), and the garage lights are on (garage_lights_on). In this example, as may be the case, some of the nondeterminism is independent (e.g., the locked status of the garage door and the alarm status), but nondeterminism may include a dependency (e.g., the gate status plays a role only when the alarm is not on).

As demonstrated in FIG. 3, the effect of an action can be viewed as an AND-OR tree. A realization of the effect may include all fluents or their negations that appear in a subtree that includes exactly one child of each of its OR nodes and all children of each of its AND nodes. In other words, a realization can be thought of as one possible result of an action's execution. In this disclosure, R(a) refers to the set of all possible realizations for action a. For each such realization $r \in R(a)$, $DEL_r$ refers to the set of fluents removed from the state s as a result of the action a, and $ADD_r$ refers to the fluents added to the state 150. In some embodiments of the invention, it is assumed that, for all actions and their realizations, $ADD_r \cap DEL_r = \emptyset$, meaning there is no intersection between these sets.

The arbitrary nesting of fluents, $\wedge$ operators, and $\oplus$ operators mirror the common description of FOND problems in PDDL using AND and ONEOF clauses. For execution purposes, it can be assumed that every subformula of an action's effect is uniquely identifiable. Solutions to a FOND problem generally come in two main forms: (1) policies mapping each state 150 of the world to an action, and (2) controllers, where the nodes and edges of an action graph respectively correspond to actions and possible outcomes.

A solution to a FOND planning problem is an action graph $\langle N, E, n_0 \rangle$, where N is the set of nodes in the graph corresponding to the actions the automated agent 105 can take, and E is the set of edges corresponding to the possible outcomes of each action associated with the nodes. This graph differs from the AND-OR effect tree 300 discussed above, which demonstrates the effect of one action only. According to this disclosure, $n_0 \in N$ refers to an initial node in which the automated agent 105 should begin executing. Each node may represent a respective state 150. In some embodiments of the invention, there exists a function that maps nodes to actions, action: $N \rightarrow A$, as well as a function mapping the realizations of actions taken at a node to the outgoing edges of the node n, $edge_n: R(action(n)) \rightarrow outgoing(n)$. In other words, each node represents a set of actions that are available to be taken. After an action is taken, the resulting realization may be determined by determining the set of fluents that change as an effect of the action. From the realization (i.e., knowledge of changes to the fluents) of an action taken at a given node, an applicable outgoing edge may be determined. This outgoing edge may lead to a new node, which may represent another set of actions that can be taken. This series of operations may be repeated at each node reached. Thus, this notation for mapping nodes and edges to the original FOND problem enables the plan 110 and its execution to be tied together.

In some embodiments of the invention, outcome determination is a fundamental part of action execution within a contingent plan 110. Outcome determination decides which realization $r \in R(a)$ of the action a has occurred after the action callback function $AEF_a$. The action realization r may include the $ADD_r$ and $DEL_r$ sets. During the outcome determination, those sets may be recursively calculated from the respective effect tree 300 associated with an action a that is taken. Specifically, after the action a is taken, the effect tree 300 may be traversed, using one or more determining callback functions to generate the update sets and thereby determine how to update the state 150.

After an action is performed, the execution system 100 may determine the realization based on the effect tree 300 associated with the action taken, by recursively determining the update sets of fluents. An effect tree 300 may include nodes with two kinds of operators: the AND operator and the ONEOF operator.

Given the AND operator $\Lambda_\varphi$, with subformulae $\varphi_i$, the update sets may be recursively calculated as follows:

$$ADD_{\Lambda\varphi} = \bigcup_{\varphi_i} ADD_{\varphi_i}$$

$$DEL_{\Lambda\varphi} = \bigcup_{\varphi_i} DEL_{\varphi_i}$$

Given the ONEOF operator $\oplus_\varphi$, and given a selected child subformula $\oplus_j$, the update sets may be recursively calculated as follows:

$$ADD_{\oplus_\varphi} = ADD_{\varphi_j}$$

$$DEL_{\oplus_\varphi} = DEL_{\varphi_j}$$

The leaves of the effect tree 300, $\varphi_L$, may directly define the $ADD_{\varphi_L}$ and $DEL_{\varphi_L}$ sets without further recursivity. With this recursion defined, the realization update sets, $ADD_r$ and $DEL_r$, may be calculated as update sets for the top-level root node of the effect tree 300, with recursion ending after the leaves are evaluated. In some embodiments of the invention, part of outcome determination is the $\oplus_{\varphi_j}$ selection. In practical systems, this selection can be a time-consuming service call (e.g., application of a machine-learning model in a remote cloud) issued by an outcome determiner, and therefore exhaustive calculation over the whole effect tree 300 might not be suitable. According to some embodiments of the invention, however, effects can be processed top-down, such that only the nodes that can contribute to the realization are evaluated. For instance, each ONEOF node needs only one subtree to be fully evaluated. Once a portion of a subtree is determined not to have occurred, then that entire subtree may be ignored. On the other hand, in some embodiments of the invention, all subtrees of an AND node are evaluated, which can be performed in parallel because the resulting update sets are nonintersecting by definition.

Retaining the full complexity of action effects may thus provide the following key improvements on efficiency: the ability to avoid evaluating subtrees that correspond to outcomes deemed not to have occurred; and the ability to run determiners (i.e., determining callback functions 134) to perform outcome determination in parallel when they represent sibling subtrees of an AND node in the effect tree 300.

With the realization update sets determined, the new state 150 after performance of the action execution can be calculated as follows, where "\" represents the set minus operation: $s_{i+1} = (s_i \backslash DEL_r) \cup ADD_r$. The new state $s_i$ may thus describe the current set of fluents and may be equal to the previous state minus $DEL_r$ and plus $ADD_r$. As discussed above, some embodiments of the invention update the context 160 in addition to updating the state 150. New context values may be updated during the same recursive determination process described above. When determining the update sets by way of traversal through the effect tree 300, the determining callback functions 134 may return values associated with the fluents checked. These values may be used to update the context 160 along with the state 150.

The above example of FIGS. 2-3 regarding the garage door illustrates a possible context update. Specifically, after performing the action callback function $AEF_{prepare\_garage\_car\_exit}$, one or more determining callback functions 134 may be called while traversing the effect tree 300 of FIG. 3. The determining callback function 134 that determines that have_fuel_level is true may also return the contextual value of this fluent. This value may be used to update the context 160.

Formally, a realization $r \in R(a)$ may have an associated set of context updates $C_r$, defined as follows for each fluent f:

$$\{C(f) = val | f \in ADD_r\} \cup \{C(f) = \bot | f \in DEL_r\}$$

In other words, for each fluent added to the state 150, a contextual value of the fluent may be determined and added to the context 160, and for each fluent removed from the state 150, the contextual value may be removed from the context 160. The assignment of $C(f)=val$ may be defined by the determining callback functions 134 for the leaf nodes of the effect tree 300, $DET_{\varphi_j}$. It will be understood that the value of all fluents need not be known for execution. For such fluents whose context 160 is not necessary at a given time, the value of such fluents may be set to undefined, as follows: $C(f)=\bot$. These context updates may force the precise alignment of context 160 and state 150, which may be necessary for the execution system 100 to function properly during execution.

Thus, the execution system 100 may execute contingent plans 105. In some embodiments of the invention, as discussed above in detail, the execution system 100 addresses the following challenges: (1) establishing a connection between the abstraction used by a planner (i.e., state 150) and the real-world view (i.e., context 160); (2) distinguishing the process by which the execution system 100 affects the world from the process by which the execution system 100 updates its understanding as a result of the effect; and (3) handling the complexity of nested effects of actions.

To summarize, FIG. 4 is a flow diagram of a method 400 for executing a contingent plan 110 online, according to some embodiments of the invention. As shown in FIG. 4, at block 405, the execution system 100 may be initialized to execute a plan 110. Initialization may involve determining the truth or falsity of each fluent, as well as the value of each fluent deemed true. The automated agent 105 may be capable of making these determinations. In some embodiments of the invention, it may be assumed that the execution system 100 begins in the initial state 150 of the plan 110, in which case fluents are already known, but the context 160 may still need to be detected. Thus, through detection by the automated agent 105 as needed, the current state 150 and context 160 of the execution system 100 may be established and saved in the database 120.

At block 410, it may be determined which actions can be taken. For instance, based on the current state 150, the current node within the action graph for the plan 110 may be known. As discussed above, nodes may map to available actions, and thus the set of available actions may be determined as well.

At block 415, an action may be taken. This action may be selected from among the available actions, such that the preconditions, if any, of the action are met. More specifically, for instance, a recommended action according to the plan 110 may be selected, where the recommended action is recommended for moving toward the goal of the plan 110.

At block 420, an appropriate determining callback function 134 may be selected for determining an effect of the action. For example, and not by way of limitation, there may exist a determining callback function 134 associated with each action and thus configured to evaluate the various nodes of the effect tree 300 associated with the respective action. In that case, the execution system 100 may select the determining callback function 134 associated with the action. For another example, there may be a single determining callback function, which may be capable of evaluating any effect tree 300 specified. In that case, the single determining callback function 134 may be selected for us. For yet another example, there may exist a determining callback function for each fluent or each category of fluents, if fluents are categorized. In that case, the determining callback functions 134 selected may correspond to the fluents referenced in the effect tree 300. In short, the mechanism for selecting a determining callback function 134 may depend on how the determining callback functions 134 are designed, and one of skill in the art will understand how to make such selection based on design choices.

At block 425, the effect of the action may be determined, where that effect may be nondeterministic and may include one or more outcomes. To this end, one or more determining callback functions 134 may be called with reference to the effect tree 300 associated with the action, while recursively traversing the effect tree 300. It will be understood that this can be implemented in various ways. For example, a determining callback function 134 may traverse the effect tree 300, recursively calling itself for each subtree of the effect tree 300. If the root of a current tree, whether the effect tree 300 or root of a subtree, is a ONEOF node, then the determining callback function 134 may be called for each child tree in turn. If, on the other hand, the root of the current tree is an AND node, then the determining callback function 134 may be called in parallel for each child tree. When a leaf is reached, the determining callback function 134 may return a value that indicates the truth or falsity of the leaf subformula. Additionally, the determining callback function may return a value of any leaf fluent deemed to be true. It will be understood that it may be the case that a fluent at a leaf may be true while the value of the subformula at the leaf is false, as is the case, for example, if the subformula is the negation of the fluent. This process may determine the realization r of the action, which may include the update sets $ADD_r$ and $DEL_r$, which indicate how the fluents have changed. For another example, the execution system 100 may traverse the effect tree 300 as discussed above and, upon reaching each leaf, may call a determining callback function 134 to evaluate the leaf. The resulting values of the leaf evaluations may then be passed back up the tree to determine the update sets during the traversal.

At block 430, based on the outcome, specifically the realization, for example, the execution system 100 may determine that it now operates from a new node. As discussed above, the realization of an action at a node may map to an outgoing edge, which leads to the new node.

At block 435, the state 150 and the context 160 may be updated in the database 120. For instance, the update sets may be used to update the state 150, and values returned by the one or more determining callback functions 134 may be used to update the context 160.

The method 400 may then return to block 410, where a new action may be taken.

FIG. 5 is a block diagram of a computer system 500 for implementing some or all aspects of the execution system 100, according to some embodiments of this invention. The execution systems 100 and methods described herein may be implemented in hardware, software (e.g., firmware), or a combination thereof. In some embodiments, the methods described may be implemented, at least in part, in hardware and may be part of the microprocessor of a special- or general-purpose computer system 500, such as a personal computer, workstation, minicomputer, or mainframe computer. For instance, each of the execution system 100 and the automated agent 105 may be implemented, in whole or in part, by a special- or general-purpose computer system 500.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor-based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid-state drive. The stored instructions in memory 510 or in storage 520 may include those enabling the processor to execute one or more aspects of the execution systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Execution systems 100 and methods according to this disclosure may be embodied, in whole or in part, in computer program products or in computer systems 500, such as that illustrated in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of operating an execution system, the computer-implemented method comprising: determining, by an automated device, a current state and a current context of an environment in which the automated device runs to execute a contingent plan, executing the contingent plan is part of automated planning by the automated device such that the automated device makes decisions to perform an action in the environment; wherein the state indicates that one or more fluents of a plurality of fluents are true, and wherein the plurality of fluents are associated with a contingent problem solved by the contingent plan; wherein the context describes context values corresponding to the one or more fluents, the context being distinct from the state of the one or more fluents, the context values being obtained using one or more determining callback functions; performing, by the automated device, an-the action with respect to at least a subset of the context to cause a-the automated device to execute the action, the automated device comprising a first set and a second set of callback functions, the first set of callback functions comprising action callback functions for execution of actions, including the action performed by the automated device, the second set of callback functions comprising the one or more determining callback functions for determining effects of the action taken by the automated device; evaluating, by the automated device, a nondeterministic effect of the action on the environment; updating, by the automated device, the state based on the nondeterministic effect; and updating, by the automated device, the context based on the nondeterministic effect;

wherein the nondeterministic effect comprises one or more nondeterministic outcomes determined based on an effect tree associated with the action and comprising a plurality of nested nondeterministic outcomes, the one or more determining callback functions being configured to traverse the effect tree and to recursively call itself for each subtree of the effect tree.

2. The computer-implemented method of claim 1, wherein evaluating the nondeterministic effect comprises: traversing an effect tree that describes a plurality of nested nondeterministic effects of the action; and applying the one or more determining callback functions to the effect tree to determine a first set of fluents to add to the state and a second set of fluents to remove from the state.

3. The computer-implemented method of claim 2, further comprising updating the state to a new state based on the first set of fluents to add to the state and the second set of fluents to remove from the state.

4. The computer-implemented method of claim 3, further comprising selecting a next action based at least in part on the new state.

5. The computer-implemented method of claim 2, wherein evaluating the nondeterministic effect further comprises determining a respective value associated with each fluent in the first set of fluents to add to the state, and the computer-implemented method further comprising: incorporating into the context the respective value associated with each fluent in the first set of fluents to add to the state.

6. The computer-implemented method of claim 1, wherein performing the action comprises calling a callback function with reference to a subset of the context to instruct the automated agent to execute the action.

7. An execution system comprising: a memory having computer-readable instructions; and one or more processors for executing the computer-readable instructions to perform a method comprising: determining a current state and a current context of an environment in which an automated agent runs to execute a contingent plan, executing the contingent plan is part of automated planning by the automated device such that the automated device makes decisions to perform an action in the environment; wherein the state indicates that one or more fluents of a plurality of fluents are true, and wherein the plurality of fluents are associated with a contingent problem solved by the contingent plan; wherein the context describes context values corresponding to the one or more fluents, the context being distinct from the state of the one or more fluents, the context values being obtained using one or more determining callback functions; performing, by the automated device, an-the action with respect to at least a subset of the context to cause a-the automated device to execute the action, the automated device comprising a first set and a second set of callback functions, the first set of callback functions comprising action callback functions for execution of actions, including the action performed by the automated device, the second set of callback functions comprising the one or more determining callback functions for determining effects of the action taken by the automated device; evaluating a nondeterministic effect of the action on the environment; updating the state based on the nondeterministic effect; and updating the context based on the nondeterministic effect; wherein the nondeterministic effect comprises one or more nondeterministic outcomes determined based on an effect tree associated with the action and comprising a plurality of nested nondeterministic outcomes, the one or more determining callback functions being configured to traverse the effect tree and to recursively call itself for each subtree of the effect tree.

8. The execution system of claim 7, wherein evaluating the nondeterministic effect comprises: traversing an effect tree that describes a plurality of nested nondeterministic effects of the action; and applying the one or more determining callback functions to the effect tree to determine a first set of fluents to add to the state and a second set of fluents to remove from the state.

9. The execution system of claim 8, the method performed by the one or more processors further comprising updating the state to a new state based on the first set of fluents to add to the state and the second set of fluents to remove from the state.

10. The execution system of claim 9, the method performed by the one or more processors further comprising selecting a next action based at least in part on the new state.

11. The execution system of claim 8, wherein evaluating the nondeterministic effect further comprises determining a respective value associated with each fluent in the first set of fluents to add to the state, and the method performed by the one or more processors further comprising: incorporating into the context the respective value associated with each fluent in the first set of fluents to add to the state.

12. The execution system of claim 7, wherein performing the action comprises calling a callback function with reference to a subset of the context to instruct the automated agent to execute the action.

13. A computer-program product for executing a contingent plan, the computer-program product comprising a non-transitory computer-readable storage medium having program instructions embodied therewith, the program instructions executable by a processor of an automated device to cause the processor to perform a method comprising: determining a current state and a current context of an environment in which an automated agent runs to execute a contingent plan, executing the contingent plan is part of automated planning by the automated device such that the automated device makes decisions to perform an action in the environment; wherein the state indicates that one or more fluents of a plurality of fluents are true, and wherein the plurality of fluents are associated with a contingent problem solved by the contingent plan; wherein the context describes context values corresponding to the one or more fluents, the context being distinct from the state of the one or more fluents, the context values being obtained using one or more determining callback functions; performing an-the action with respect to at least a subset of the context to cause a the device to execute the action, the automated device comprising a first set and a second set of callback functions, the first set of callback functions comprising action callback functions for execution of actions, including the action performed by the automated device, the second set of callback functions comprising the one or more determining callback functions for determining effects of the action taken by the automated device; evaluating a nondeterministic effect of the action on the environment; updating the state based on the nondeterministic effect; and updating the context based on the nondeterministic effect; wherein the nondeterministic effect comprises one or more nondeterministic outcomes determined based on an effect tree associated with the action and comprising a plurality of nested nondeterministic outcomes, the one or more determining callback functions being configured to traverse the effect tree and to recursively call itself for each subtree of the effect tree.

14. The computer-program product of claim 13, wherein evaluating the nondeterministic effect comprises: traversing an effect tree that describes a plurality of nested nondeterministic effects of the action; and applying the one or more determining callback functions to the effect tree to determine a first set of fluents to add to the state and a second set of fluents to remove from the state.

15. The computer-program product of claim 14, the method performed by the processor further comprising updating the state to a new state based on the first set of fluents to add to the state and the second set of fluents to remove from the state.

16. The computer-program product of claim 15, the method performed by the processor further comprising selecting a next action based at least in part on the new state.

17. The computer-program product of claim 14, wherein evaluating the nondeterministic effect further comprises determining a respective value associated with each fluent in the first set of fluents to add to the state, and the method performed by the processor further comprising: incorporating into the context the respective value associated with each fluent in the first set of fluents to add to the state.

* * * * *